US012257588B2

(12) United States Patent
Leonard

(10) Patent No.: US 12,257,588 B2
(45) Date of Patent: Mar. 25, 2025

(54) CENTRIFUGAL SEPARATOR

(71) Applicant: Jeremy Leonard, Ardrossan (CA)

(72) Inventor: Jeremy Leonard, Ardrossan (CA)

( * ) Notice: Subject to any disclaimer, the term of this patent is extended or adjusted under 35 U.S.C. 154(b) by 996 days.

(21) Appl. No.: 16/588,469

(22) Filed: Sep. 30, 2019

(65) Prior Publication Data

US 2020/0215553 A1 Jul. 9, 2020

Related U.S. Application Data

(60) Provisional application No. 62/790,140, filed on Jan. 9, 2019.

(51) Int. Cl.
*B04B 3/04* (2006.01)
*B04B 1/20* (2006.01)

(52) U.S. Cl.
CPC .................. *B04B 3/04* (2013.01); *B04B 1/20* (2013.01); *B04B 2001/2091* (2013.01)

(58) Field of Classification Search
CPC ..... B04B 3/04; B04B 1/20; B04B 2001/2091; B04B 2001/205
See application file for complete search history.

(56) References Cited

U.S. PATENT DOCUMENTS 2,528,974 A 11/1950 Ritsch
2,600,372 A 6/1952 Milliken et al.
3,228,593 A 1/1966 Topping
3,419,148 A 12/1968 Niwa et al.
3,938,434 A 2/1976 Cox
4,731,182 A 3/1988 High
4,774,097 A 9/1988 Bushman et al.
4,997,578 A 3/1991 Berggren
5,357,855 A 10/1994 Ishigaki et al.
6,451,213 B2 9/2002 Huebner
(Continued)

FOREIGN PATENT DOCUMENTS

DE 4041923 A1 7/1992
EP 0553783 A1 9/1996
(Continued)

OTHER PUBLICATIONS

"High-Efficiency Differential Rotation Screw Press," © Mitsubishi Kakoki Kasha, Ltd. <http://www.kakoki.co.jp/english/products/e-019/index.html>, pp. 1-2.

*Primary Examiner* — Walter D. Griffin
*Assistant Examiner* — Shuyi S. Liu
(74) *Attorney, Agent, or Firm* — CHRISTENSEN O'CONNOR JOHNSON KINDNESS PLLC

(57) ABSTRACT

A centrifugal separator for separating solids from a liquid stream has a rotating drum with a perforated outer wall, an auger in the rotating drum, and a driver that rotates the drum and the auger. The drum has an inlet at a first end for receiving the liquid stream, and a solids outlet at a second end. The auger has a helical flight with an outer edge that is immediately adjacent to an inner surface of the outer wall. The driver rotates the rotating drum to apply a centrifugal force to fluids within the rotating drum such that liquid exits via the perforated outer wall, and the auger is rotated at a different speed such that the auger removes solids from an inner surface of the rotating drum and conveys the solids toward the solids outlet.

10 Claims, 6 Drawing Sheets

(56) References Cited

U.S. PATENT DOCUMENTS

| | | | | |
|---|---|---|---|---|
| 6,615,710 | B1 * | 9/2003 | Ishigaki ................. | B01D 37/04 100/48 |
| 7,918,347 | B2 | 4/2011 | Geisbauer | |
| 8,881,648 | B2 | 11/2014 | Yamashita et al. | |
| 9,003,968 | B2 | 4/2015 | Kozanda et al. | |
| 9,561,978 | B2 * | 2/2017 | Theodoulou .............. | B30B 9/12 |
| 10,195,806 | B2 | 2/2019 | Roiss | |
| 2005/0202950 | A1 | 9/2005 | Dircks et al. | |
| 2010/0012596 | A1 * | 1/2010 | Lee ........................ | B01D 25/28 210/405 |
| 2016/0236208 | A1 * | 8/2016 | Vicentini et al. ......... | B04B 3/04 |
| 2017/0014836 | A1 * | 1/2017 | Fisher ..................... | B04B 15/06 |
| 2017/0088435 | A1 * | 3/2017 | Schuiten ................ | B01D 33/06 |
| 2017/0088802 | A1 | 3/2017 | Banke | |

FOREIGN PATENT DOCUMENTS

| | | | |
|---|---|---|---|
| GB | 2103502 | A | 2/1983 |
| JP | 3609959 | B2 | 1/2005 |
| WO | 9012919 | A1 | 11/1990 |

* cited by examiner

CENTRIFUGAL SEPARATOR

TECHNICAL FIELD

This relates to the separation of suspended solids from liquids, and in particular, to the use of centrifugal separation to produce a dried solids stream.

BACKGROUND

It is often desirable to separate suspended solids from a mixture with liquid. These suspended solids may be of a variety of sizes, ranging from large debris items such as tree branches, to very small particulate contaminants having a specific gravity that is similar to that of water. While large debris items may be separated by filtration or settling, the separation of very small particulate poses different challenges. Conventional filtration techniques for these very small particulate include filtration bags to which pressure is applied to remove liquid. One such filter system is described in United States pregrant pub. no. 20130153511 (Smits) entitled “Process For Dewatering Of Oil Sand Tailing Muds”.

SUMMARY

According to an aspect, there is provided a centrifugal separator for separating solids from a liquid stream. The separator comprises a rotating drum comprising a perforated outer wall, the rotating drum having first end and a second end, the perforated outer wall having perforations that are about 60 microns or less, an auger positioned within the rotating drum, the auger having a helical flight that has an outer edge that is immediately adjacent to an inner surface of the outer wall, an inlet on communication with the first end of the rotating drum, the inlet receiving the liquid stream to be separated, a solids outlet at the second end of the rotating drum, and a driver that rotates the rotating drum and the auger about an axis of rotation. In operation the driver rotates the rotating drum at a first rotational speed to apply a centrifugal force to fluids within the rotating drum, the perforated outer wall permitting liquid to exit the rotating drum, and the driver rotates the auger at a second rotational speed that is different than the first rotational speed such that the outer edge of the auger removes solids from an inner surface of the perforated outer wall and the auger conveys the solids toward the solids outlet.

According to other aspects, the centrifugal separator may further comprise a high pressure fluid source adjacent to an outer surface of the perforated outer wall and extending parallel to the axis of rotation, the high pressure fluid source applying a pressure differential across the perforated outer wall to clear perforations of obstructions, the high pressure fluid source may comprise a gas or a liquid, a volume defined between turns of the helical flight adjacent to the solids outlet may be less than a volume defined between turns of the helical flight adjacent to the inlet, the helical flight may have a pitch, with the pitch of the helical flight adjacent to the inlet being greater than the pitch of the helical flight adjacent to the solids outlet, the auger may further comprise a shaft having a diameter that varies along the length of the shaft such that the diameter of the shaft adjacent to the inlet is less than the diameter adjacent to solids outlet, the centrifugal separator may further comprise a housing that surrounds the perforated outer wall to capture liquids exiting the rotating drum, the solids outlet may comprise a variable back pressure surface to control a liquid content of the solids exiting the rotating drum, the outer edge of the auger may comprise a wiper surface that engages the inner surface of the outer wall, the auger may further comprise a hollow shaft, the inlet may comprise one or more discharge ports formed in the hollow shaft, the perforations may be about 60 microns or less, or 30 microns or less, the driver may be configured to rotate the rotating drum at over about 800 rpm, the driver may be configured to rotate the rotating drum at over about 1000 rpm, and the auger press may further comprise a reinforcing outer shell adjacent to the perforated outer wall.

According to an aspect, there is provided a method of separating solids from a liquid stream, comprising the steps of introducing the liquid stream into a rotating drum at a first end, the rotating drum comprising a perforated outer wall and having an auger disposed therein, the perforated outer wall having perforations that are between about 1 and 60 microns the auger comprising a helical flight having an outer edge that is immediately adjacent to an inner surface of the outer wall, rotating the rotating drum about an axis of rotation at a first rotational speed to apply a centrifugal force to fluids within the rotating drum, and permitting liquid to exit the rotating drum through the perforated outer wall, and rotating the auger about the axis of rotation at a second rotational speed that is different than the first rotational speed to cause the auger to convey solids in the rotating drum toward the solids outlet.

According to other aspects, the first rotational speed and the second rotational speed may be controlled to control a discharge rate from the solids outlet, and a liquid content in solids discharged from the solids outlet, the method may further comprise the step of applying a pressure differential across the perforated outer wall to clear perforations of obstructions, the pressure differential may be applied using a high pressure fluid source adjacent to an outer surface of the perforated outer wall and extending parallel to the axis of rotation, the high pressure fluid source may comprise a gas or a liquid, the helical flight may have a pitch, with the pitch of the helical flight adjacent to the inlet being greater than the pitch of the helical flight adjacent to the solids outlet, the auger may further comprise a shaft having a diameter, wherein the diameter of the shaft adjacent to the inlet is less than the diameter adjacent to solids outlet, a volume between the flights of the auger may be less adjacent to the solids outlet relative to adjacent to the inlet, the method may further comprise the step of capturing liquids exiting the rotating drum within a housing that surrounds the perforated outer wall, the method may further comprise the step of applying a variable back pressure using a variable back pressure surface at the solids outlet to control a liquid content of the solids exiting the rotating drum, the outer edge of the auger may comprise a wiper surface that engages the inner surface of the outer wall, wherein the auger may comprise a hollow shaft with a plurality of ports open to the first end of the rotating drum, the liquid stream may be introduced into the rotating drum at the first end via the hollow shaft of the auger, the perforations may be about 30 microns, the first rotational speed may be over about 800 rpm, the first rotational speed may be over about 1000 rpm and the rotating drum may further comprise a reinforcing outer shell adjacent to the perforated outer wall.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 6:
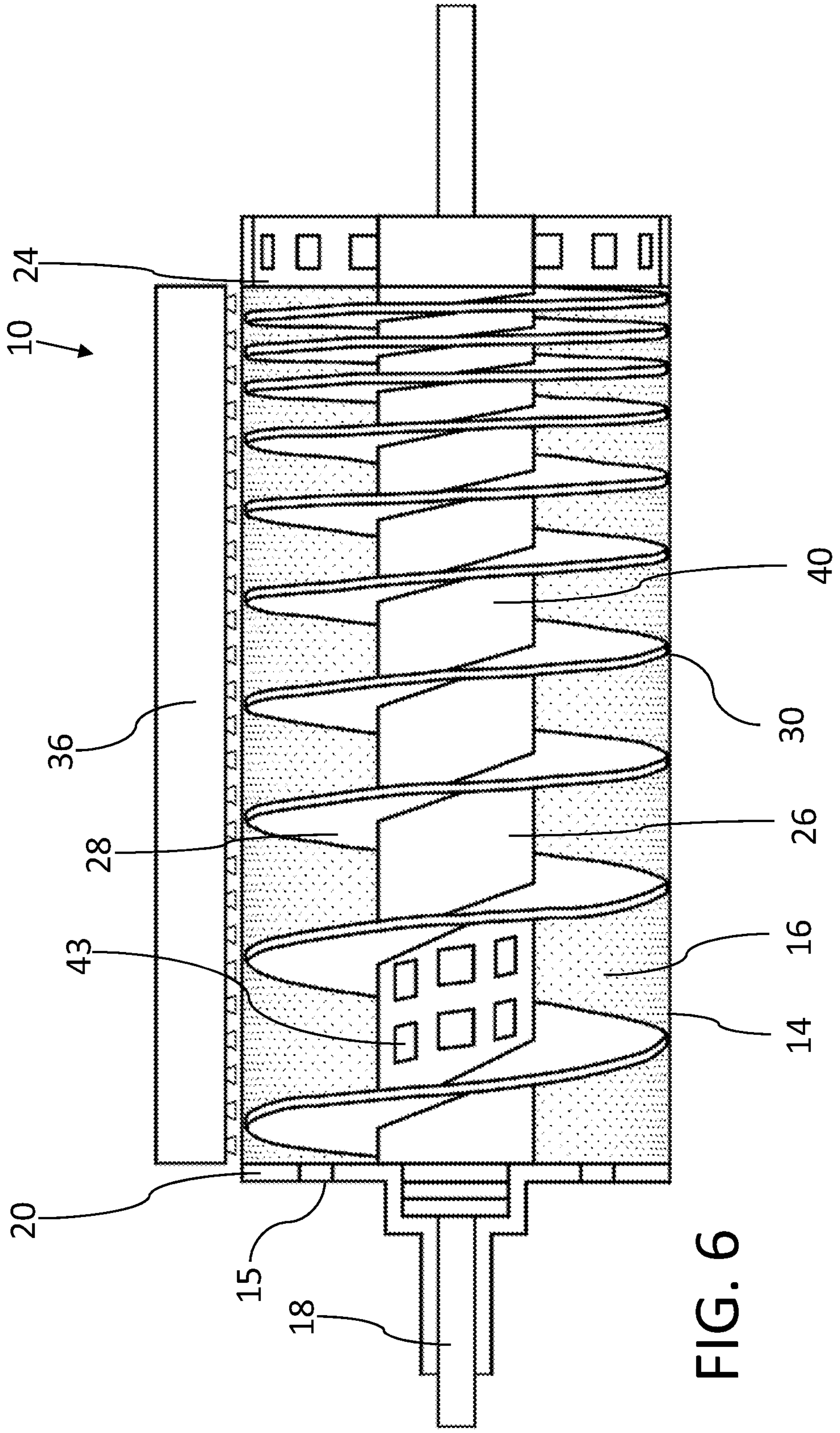
FIG. 6 is a side elevation view of a centrifugal separator with a variable helical pitch.

A centrifugal separator 10 for separating solids from a liquid stream is shown, generally identified by reference numeral 10, will now be described with reference to FIGS. 1 and 6.

Figure 1:
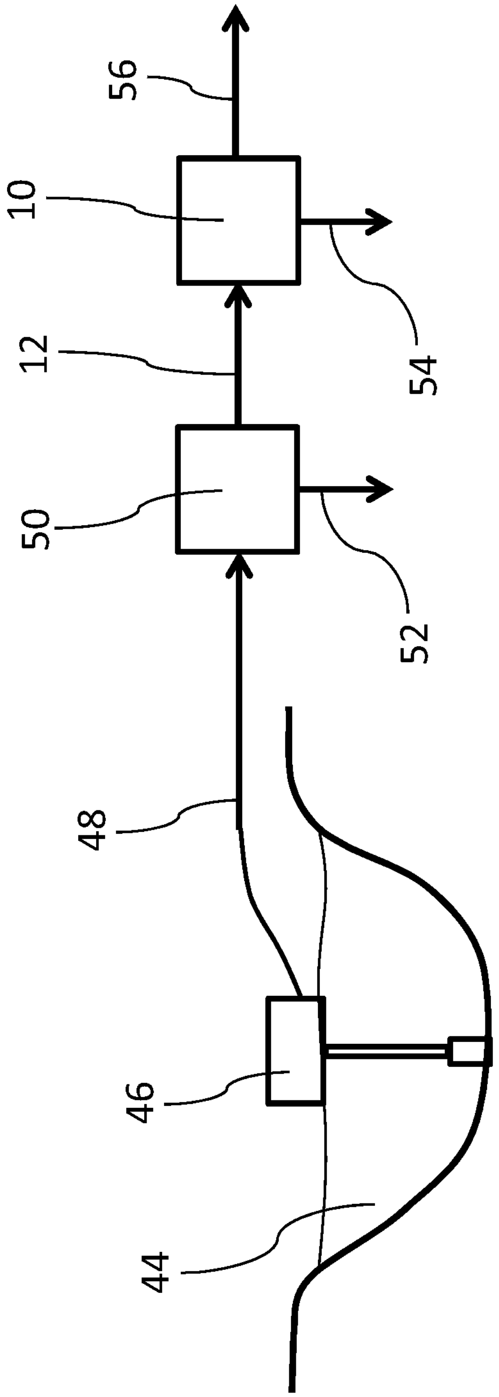
FIG. 1 is a block diagram of a separation system.

Referring to FIG. 1, the centrifugal separator 10 will be described in terms of tailings that carry suspended solids, which may be present, for example, in a tailings pond. It will be understood that the teachings herein may be applicable to other situations where suspended solids are carried in a liquid, typically water, and other sources of tailings other than a tailings pond 44 as depicted in FIG. 1. The term suspended solids is generally used to refer to fine particles that have a specific gravity sufficiently close to that of water that the fine particles do not tend to separate from water either by gravity or in a centrifuge, or that are otherwise suspended within the water. The size of what may be considered fine tailings may vary depending on the source, but may be particles that are sized at around 50 microns or less. In the depicted example, the water is sourced from tailings pond 44, where a dredging apparatus 46 removes water and material from the bottom of the body of water, and delivers the slurry through a line 48. The slurry may pass through an initial separator 50 that removes debris and larger particles that can be more easily removed from the slurry, and which are removed from the process as an output stream 52. The remaining liquid stream 12 is then delivered to centrifugal separator 10. Centrifugal separator 10 creates a solids output stream 54 and a liquid output stream 56. In other situations, the water containing suspended solids may be obtained from different sources, and transported using other known or conventional transportation equipment. If required initial separator 50 may be used to remove particles or solids greater than a certain size, such as an initial separator 50 may be a filter screen, a centrifugal separator, a gravity separator, or other known type of separator that is able to remove heavier solids from water. Initial separator 50 may include more than one stage, and more than one type of equipment, depending on what is being removed from the slurry. Initial separator 50 may also include the use of flocculants, which may be used to flocculate the suspended particles and increase the size of particles, making it easier to remove the particles. This may be done prior to or during processing in initial separator 50, or prior to being injected into centrifugal separator 10. Initial separator 50 will preferably remove most or all of the larger components that may be found in the fluid stream, such that centrifugal separator 10 deals primarily with the fine tailings that remain in the slurry.

As noted above, the specific gravity of fine tailings are similar to that of water, making it difficult to separate the particles using gravity or centrifugal force. In addition, the fine tailings may have electrical charges or may be polar molecules that interact with the water molecules that also prevent them from separating by gravity or centrifugal force. As will be described in more detail below, the presently described separator and method of separation uses a filtering screen carried by an outer drum that captures very small particles, while allowing water particles to exit the drum. The drum is rotated at very high speeds, and in particular, on the order of typical centrifuges that may be used in industry, to apply centrifugal forces that will draw the water out of the slurry that enters the drum. Typically, a centrifuge is used to separate components with different specific gravities into layers. As this is not an effective separation strategy for a slurry based on tailings, the separator provides apertures that allow water to exit the drum. In addition, in order to prevent the filtering screen from becoming clogged or blocked with solids, an auger-type structure is provided that rotates at a different speed than the rotating drum in order to scrape or wipe the inner surface of solids, while also continually conveying solids toward the outlet. At the same time, a stream of pressurized cleaning fluid, such as air, nitrogen, water, cleaning solution, etc. impinges on the outer surface of the drum to clear the apertures in the screen of solids. Generally, the stream of pressurize fluid will be in a fixed position relative to the rotating drum, such that the apertures are cleared for each rotation of the drum, or partial rotation, if more than one stream of pressurized fluid is provided around the drum. This design is intended to allow for a design that allows for continual separation, rather than batch separation, and in large volumes that may be required in processing tailings from ponds.

Figure 2:
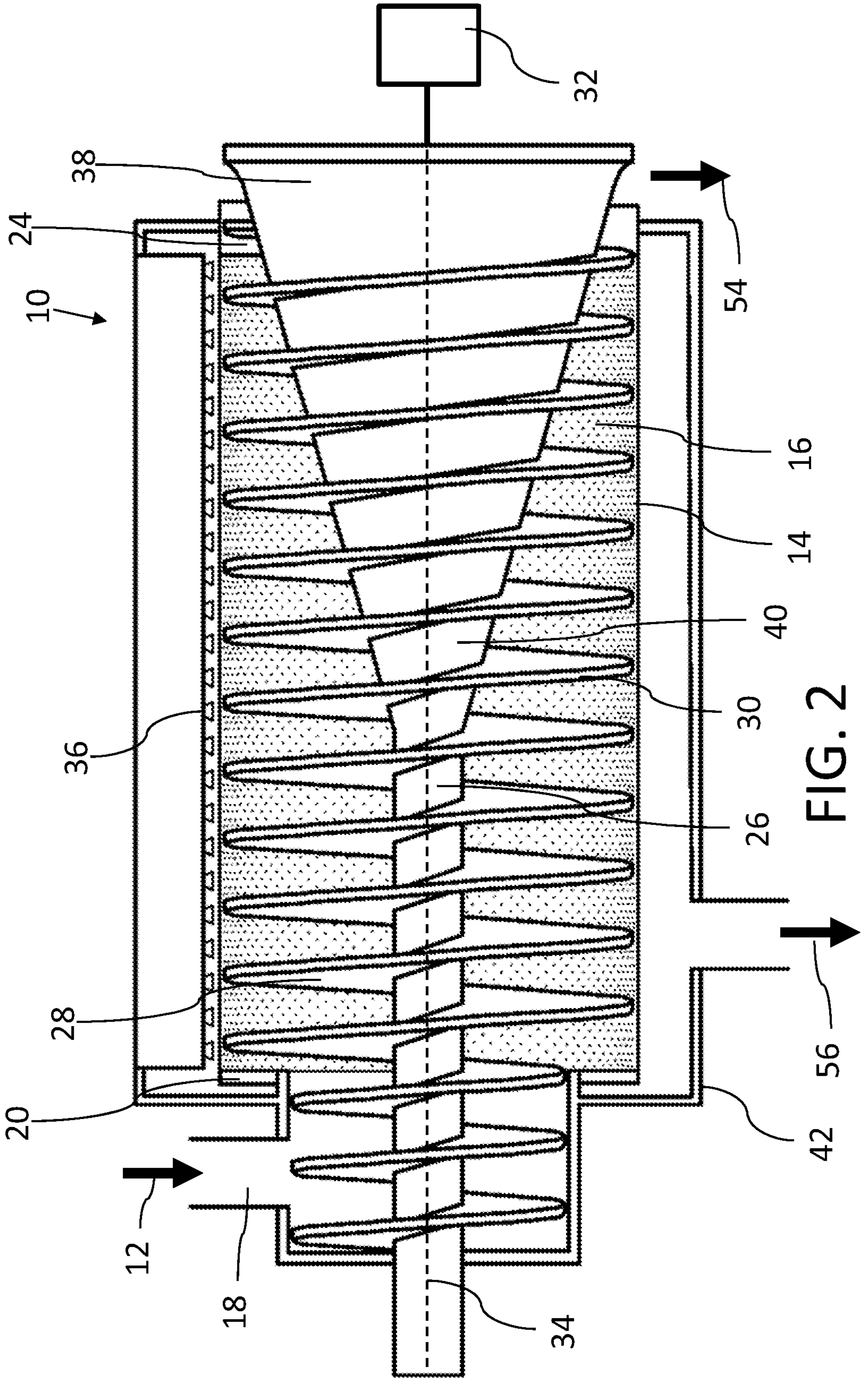
FIG. 2 is a side elevation view in partial cross section of a centrifugal separator.
Figure 3:
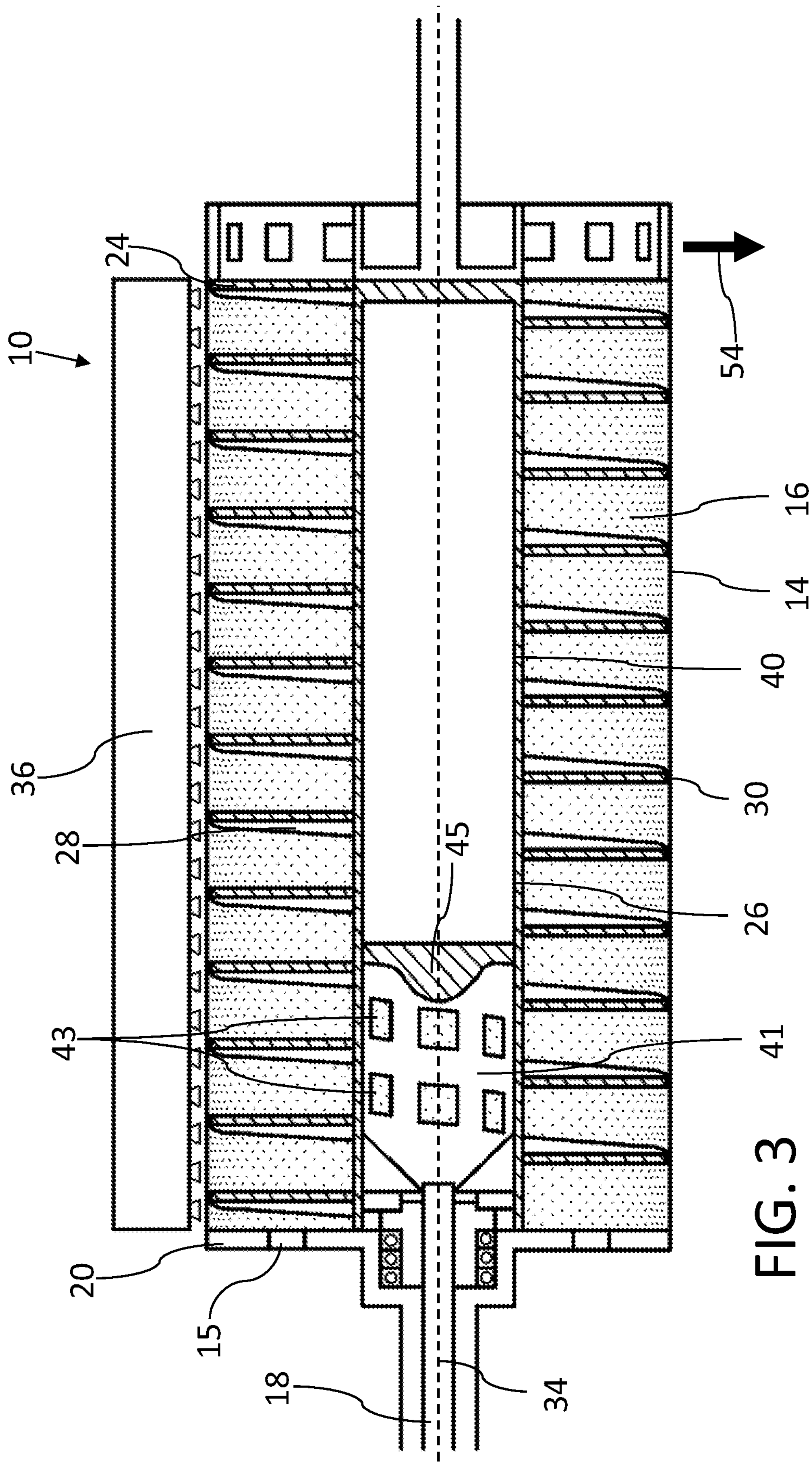
FIG. 3 is a side elevation view of a side elevation view in cross section of a centrifugal separator with a hollow shaft.
Figure 4:
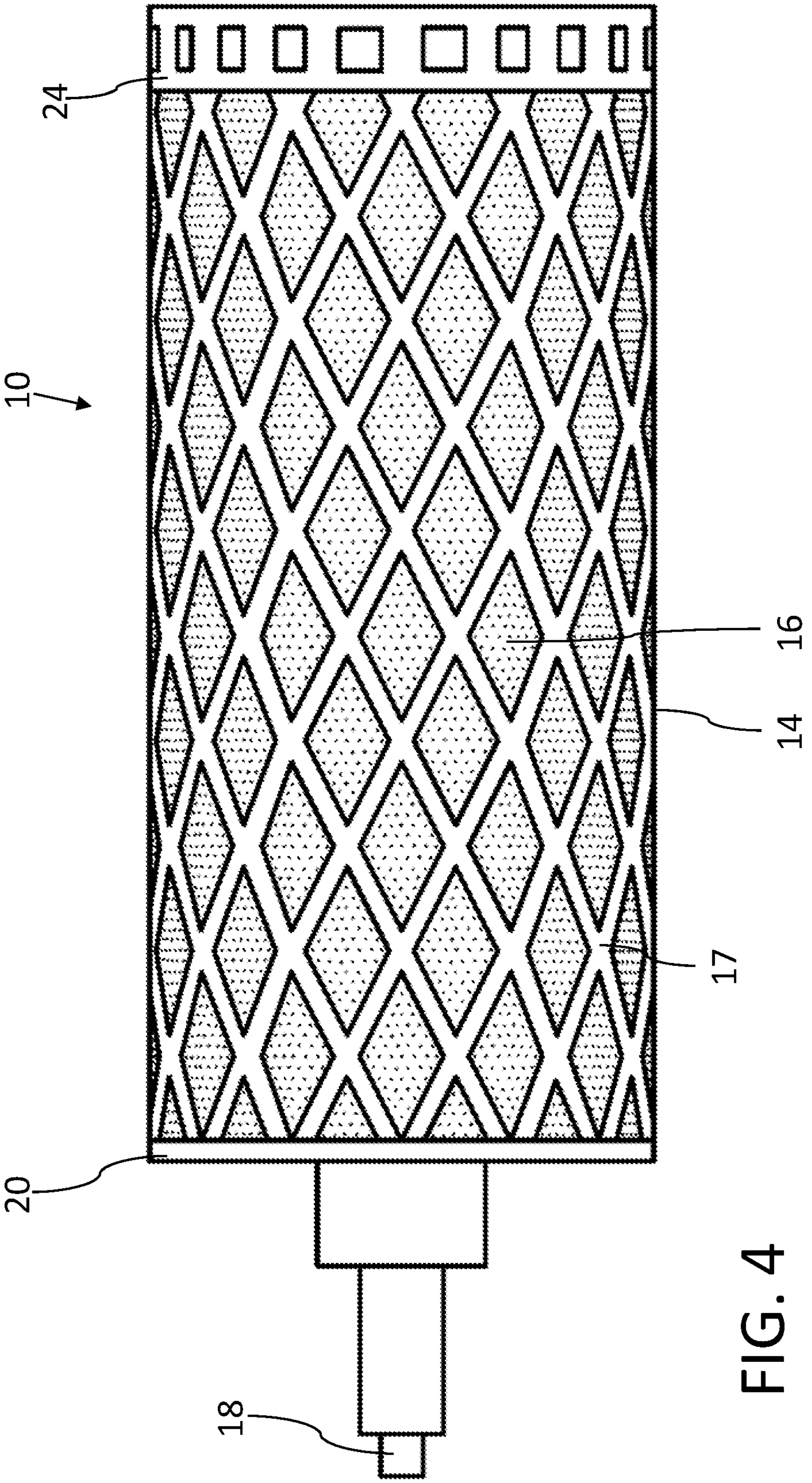
FIG. 4 is a side elevation view of an outer drum of a centrifugal separator.
Figure 5:
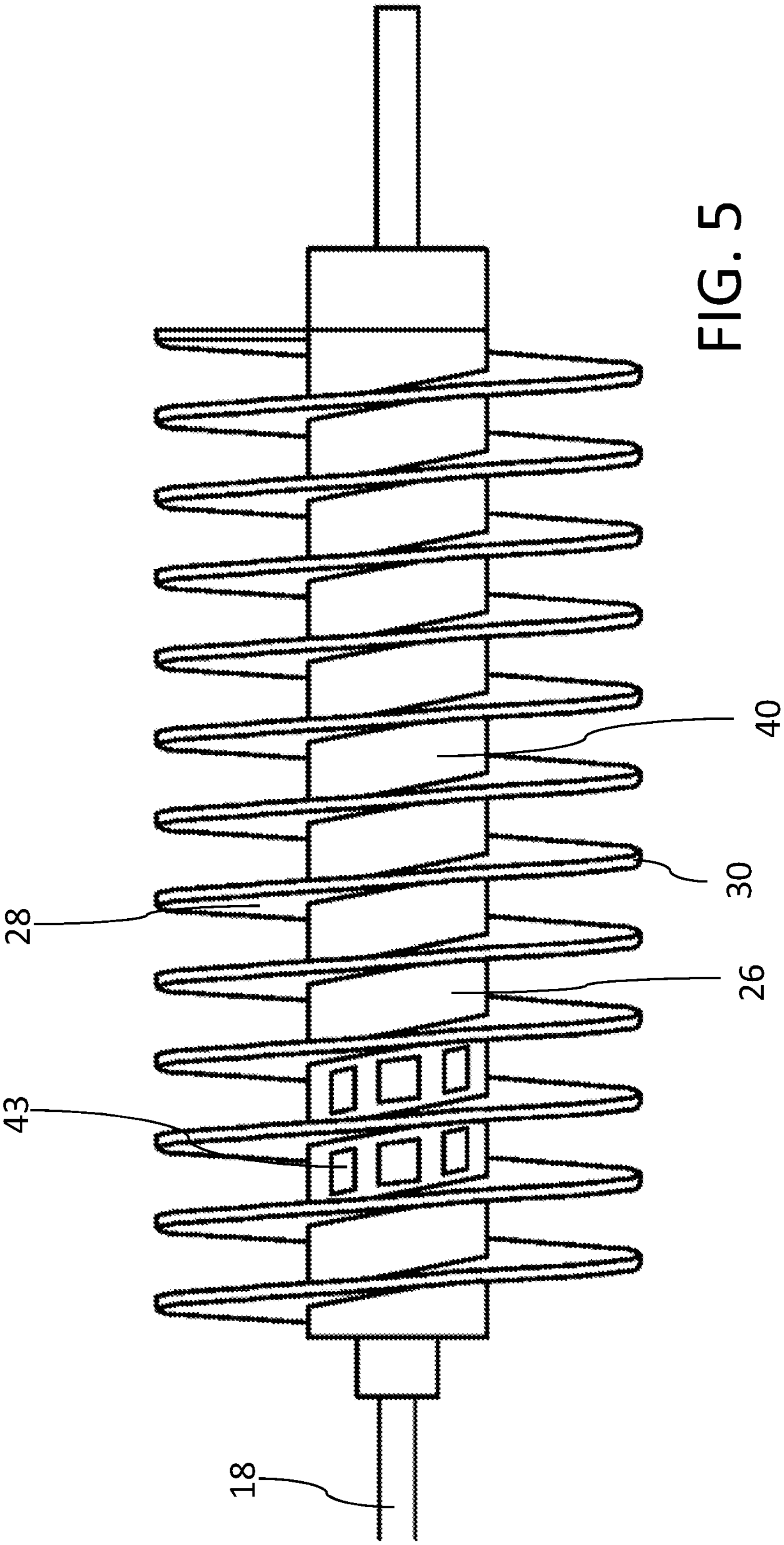
FIG. 5 is a side elevation view of an auger for a centrifugal separator.

Referring to FIG. 2 to FIG. 6, different embodiments of centrifugal separator 10 are shown. Referring now to FIG. 2, centrifugal separator 10 for separating solids from a liquid stream 12 is shown. Centrifugal separator 10 has a rotating drum 14 with a perforated outer wall 16, an inlet 18 at a first end 20 for receiving liquid stream 12 to be separated, and a solids outlet 22 at a second end 24 of rotating drum 14. Centrifugal separator 10 may also have a housing 42 that surrounds perforated outer wall 16 to capture liquids exiting rotating drum 14. Perforated outer wall 16 may be made from titanium or other material that has sufficient structural strength to withstand the forces to be applied, while maintaining the structural integrity and size of the perforations. The perforations may be laser cut into the material. As shown in FIG. 4, it may be necessary to provide a reinforcing outer shell 17 for perforated outer wall 16 to provide additional structural support. This reinforcing outer shell may, for example, be a metal mesh placed along the exterior of perforated outer wall 16, or other design that reinforces outer wall 16.

An auger 26 is positioned within rotating drum 14. The helical flight 28 of auger 26 has an outer edge 30 that is immediately adjacent to an inner surface of outer wall 16. A driver 32 rotates rotating drum 14 and auger 26 about axis of rotation 34. Driver 32 rotates rotating drum 14 at a first rotational speed to apply a centrifugal force to fluids within the rotating drum 14, while auger 26 is rotated at a second rotational speed that is different than the first rotational speed. During operation, the rotation causes liquids and the solids to move toward perforated outer wall 16, such that liquids exit rotating drum 14 via perforated outer wall 16, while solids are pressed against perforated outer wall 16. As solids are pressed against perforated outer wall 16, outer edge 30 of auger 26 engages the solids against the inside of perforated outer wall 16 such that outer edge 30 scrapes or wipes outer wall 16 of any solids, which are then conveyed toward solid outlet 22. Centrifugal separator is intended to be operated at speeds that generate forces commonly found in centrifuges. The speed of rotation will depending on the size of rotating drum 14. In some circumstances, the force may be achieved, for example, at speeds of around 800 rpm, 1000 rpm, or more.

Driver 32 may be any suitable driver that is able to drive rotating drum 14 and auger 26 at different speeds. This may include two separate motors, or may be a single motor that is geared differently for each rotational component. Driver 32 may be direct drive motors, or may be connected by gears, belts, pulleys, chains, etc. to a suitable drive shaft or gear. Preferably, the actual and/or relative rotational speed of rotating drum 14 and auger 26 are controllable and adjustable to allow a user to optimize the operation of auger press 10. Auger 26 may rotate in the same direction as drum 14, but at a different speed, such that, in relative terms, auger 26 moves relative to drum 14. Auger 26 may be rotated faster or slower than drum 14. This may depend, for example, on the direction in which helical flight 28 turns around shaft 40 in order to convey solids toward solids outlet 22 during operation. Drum 14 may have liquid overflow openings 15 located near first end 20 to allow for excess fluid 12 to leave drum 14, as shown in FIG. 3.

Referring to FIG. 3, inlet 18 may be connected to an inner cavity 41 of shaft 40 such that fluid 12 passes first into inner cavity 41 and then into rotating drum 14. Inner cavity may have a plurality of discharge ports 43 through which fluid 12 enters rotating drum 14 and a spreader 45 that helps to direct fluid 12 through discharge ports 43.

Outer edge 30 of auger 26 may be a wiper edge that engages the inner surface of outer wall 16. The wiper edge may act to clear the solids collected against the inner surface of outer wall 16 to allow auger 26 to convey those solids towards solids outlet 22. In one example, to control the moisture content of the solids exiting rotating drum 14, solids outlet 22 may use a variable back pressure surface 38, which opens when a certain pressure is applied as the solids are compressed against variable back pressure surface 38. Other outlet designs may also be used.

In order to account for the decreasing volume as water exits rotating drum 14 and to apply additional compression of the solids in order to remove additional water, the volume between the flights of auger 26 may decrease as the solids progress toward solids outlet 22 relative to adjacent to inlet 18. Referring to FIG. 6, this may be achieved by providing helical flight 28 with a pitch that changes along the length of auger 26. As shown, the pitch of helical flight 28 adjacent to inlet 18 is greater than the pitch of helical flight 28 adjacent to solids outlet 22, such that the turns are more closely spaced toward solids outlet 22. The pitch of helical flight 28 may decrease continually along the length of auger 26 as shown, or the change in pitch may occur at discrete transition points or steps. Alternatively or in addition, referring to FIG. 2, auger 26 may include a shaft 40 that has a diameter that increases toward solids outlet 22. As with the pitch of helical flight 28, the change may be gradual, or occur at discrete locations or in discrete sections. These features may be combined to provide a decreasing volume due to both the decreased pitch and the increased diameter in proximity to solids outlet 22.

As drum 14 and auger 26 are rotated and solids are compressed, water exits rotating drum 14 via the perforations in perforated outer wall 16, and may be captured, for example, by an outer housing 42 and exits via outlet 56. The sizes of the perforations will be selected based on the size of the particles being separated, and in the case of tailings, will preferably be less than 60 microns, such that they are on the scale of the suspended solids being removed. In one example, the size of the perforations may be around 30 microns, and will generally be greater than 1 micron. Referring to FIG. 3, as these perforations may become clogged or blocked and may not be cleaned by outer edge 30 of auger 26, centrifugal separator 10 may be provided with a high pressure fluid source 36 outside drum 14, and may be immediately adjacent to an outer surface of perforated outer wall 16 such that it extends parallel to axis of rotation 34 along some or all of drum 14. High pressure fluid source 36 applies a pressure differential across perforated outer wall 16 to clear perforations of obstructions, and will generally be close enough that sufficient pressure is applied to outer wall 16. High pressure fluid source 36 may comprise a gas or liquid. For example, high pressure fluid source 36 may use air, nitrogen, etc., or may use water or another appropriate wash fluid. High pressure source 36 may, for example, be fixed to outer housing 42 and direct fluid towards rotating drum 14, or a discrete chamber sealed against the exterior of outer wall 16 may be provided along axis of rotation 34. High pressure fluid source 36 may also be provided by a movable nozzle or other means of directing high pressure fluid onto a surface as are known in the art. As shown, high pressure source 36 is positioned at a particular rotational position on the outside of drum 14. High pressure source 36 is preferably operated continuously such that the perforations in outer wall 16 are cleared at each rotation of drum 14.

A method of separating solids from liquid stream 12 will now be described. Liquid stream 12 is introduced into rotating drum 14 at a first end 20, and rotating drum 14 is rotated about axis of rotation 34 at a first rotational speed to apply a centrifugal force to fluids within the rotating drum. Liquid is then permitted to exit rotating drum 14 through perforated outer wall 16. Auger 26 is rotated about axis of rotation 34 at a second rotational speed that is different than the first rotational speed to cause auger 26 to convey solids in rotating drum 14 toward solids outlet 22. For example, rotating drum 14 may be rotated at 1000 rpm or more, but generally not less than 800 rpm, while auger 26 is rotated at a speed that is faster or slower than rotating drum, depending on the direction of the flights in auger 26. The actual speeds will depend on the preferences of the user and the conditions of use that may be determined during optimization of the process. This results in relative movement of auger 26 to rotating drum 14, which will cause outer edge 30 to dislodge solids that build up on the inner surface of perforated outer wall 16 due to the centrifugal force applied to the fluids. Generally speaking, it is desired to have the relative speeds set such that auger 26 pushes solids toward solids outlet 22. As liquid is able to exit rotating drum 14 through perforated outer wall 16, while solid particulates are generally prevented from exiting through the perforations due to the small size of the perforations, solids will build up against outer wall 16 to be conveyed towards solids outlet 22 by auger 26. It will be understood that this will result in the liquid content being highest near first end 20, and the density of solids will increase as the solids are conveyed towards second end 24, as the liquid is removed while the solids continue to travel within outer wall 16 and encounter other solids. The relative rotational speeds may be controlled in order to control a discharge rate from solids outlet 22, as well as a liquid content in solids discharged from solids outlet 22.

The method may also include the step of applying a pressure differential across perforated outer wall 16 to clear perforations of obstructions. Outer edge 30 of auger 26 may not clear all of the solid particulate from perforated outer wall 16, or particulate may become fixed in the perforations and not be dislodged by outer edge 30. In order to ensure that liquid is able to exit through outer wall 16, the perforations may be cleaned using high pressure fluid source 36. This cleaning may be done intermittently, or continuously along a portion of perforated outer wall 16 that extends parallel to axis of rotation 34, as shown in FIG. 1. Auger 26 may be designed to compress the solids as they move towards solids outlet 22, and this may be achieved by decreasing the volume available as the solids move towards solids outlet 22, either by decreasing the pitch of helical flight 28, increasing the diameter of shaft 40, or a combination thereof, as described above. In order to further decrease the liquid content of the solids, the pressure in proximity to solids outlet 22 may also be controlled by applying a variable back pressure using a variable back pressure surface 38. For example, variable back pressure surface 38 may be used to prevent solids that have not yet been compressed to a selected pressure from exiting through solids outlet 22, providing the opportunity for further liquid to be compressed out of the solids through perforated outer wall 16. Liquid that has exited perforated outer wall 16 may be captured by an outer housing 42 as shown in FIG. 1, and directed to liquids outlet 56.

Depending on the application of the centrifugal separator 10 and the method of separating solids from liquid stream 12, it may be desired to calibrate the system to allow for different throughputs. For example, the liquid output 56 may be recycled back to become part of liquid stream 12, passing through centrifugal separator 10 more than once and allowing for additional separation of solids. The calibration may be for high throughput, achieved for example by selecting a perforated outer wall 16 having larger perforations, and allowing liquid to be separated more quickly, or the calibration may be for higher separation, such as by selecting a perforated outer wall 16 having smaller perforations, and thereby preventing more of the solids from passing through outer wall 16.

The initial separation 50 may provide a number of separation stages and treatments to the fluid from line 48. For example, large particulate may be separated by filtration or settling, or other conventional separation techniques. The fluid may also be treated with a flocculate prior to entering centrifugal separator 10. Perforated outer wall 16 of rotating drum 14 as shown in FIG. 1 is a thin metal screen having very fine perforations formed therein. The material is preferably selected in order to allow for the preferred perforation size to be formed therein. It has been found that titanium may be a suitable material. Solids may be discharged from solids outlet 22 onto a screw or belt conveyor for disposal, or may undergo other treatments after exiting centrifugal separator 10. As an example, the solids may be transmitted to conventional dry-stack tailings facilities.

Centrifugal separator 10 may be provided with a number of sensors (not shown) and configured inputs that provide parameters such as fluid input flow and velocity, liquid output flow and velocity, conductivity of the input and outputs, rotation rates of rotating drum 14 and auger 26 and their relative rotation, densities in and out of centrifugal separator 10, air pressures, temperature, the volume of flocculant injected (if any), retention time of the flocculant, the size of the perforations in perforated outer wall 16, the injection pressure applied by high pressure fluid source 36, and the frequency with which fluid is applied through high pressure fluid source 36. These parameters may be provided to a processor, which may then be configured to vary certain parameters to optimize the performance of centrifugal separator 10. In particular, it may be desired to ensure that a particular liquid content is achieved in the solids that exit solids outlet 22, and the liquid content of these solids may be measured and used to optimize the operation of centrifugal separator 10 to ensure the desired liquid content is achieved. The processor may employ a learning algorithm to determine optimal operating conditions given a number of input parameters.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A centrifugal separator for separating solids from a liquid stream, comprising:

a rotatable drum comprising a perforated outer wall, the rotatable drum having a first end and a second end, the perforated outer wall having perforations that are about 30 microns or less;

an auger positioned within the rotatable drum, the auger having a helical flight that has an outer edge that is immediately adjacent to an inner surface of the outer wall;

an inlet in communication with the first end of the rotatable drum, the inlet receiving the liquid stream to be separated;

a solids outlet at the second end of the rotatable drum;

a driver that engages the rotatable drum and the auger, the driver being controlled by a processor that is programmed with instructions to cause the driver to:

rotate the rotatable drum about an axis of rotation at a first rotational speed of 800 rpm or more to apply a centrifugal force to fluids within the rotatable drum, the perforated outer wall permitting liquid to exit the rotatable drum; and rotate the auger about the axis of rotation at a second rotational speed that is different than the first rotational speed such that the outer edge of the auger removes solids from the inner surface of the perforated outer wall and the auger conveys the solids toward the solids outlet;

a source of high pressure fluid adjacent to an outer surface of the perforated outer wall and extending parallel to the axis of rotation, the processor further comprising instructions to cause the source of high pressure fluid to continuously apply a pressure differential across the perforated outer wall when the rotatable drum is rotating at the first rotational speed and while the inlet receives the liquid stream to be separated to clear the perforations of obstructions and such that a portion of the high pressure fluid enters the rotatable drum.

2. The centrifugal separator of claim 1, wherein a volume defined between turns of the helical flight adjacent to the solids outlet is less than a volume defined between turns of the helical flight adjacent to the inlet.

3. The centrifugal separator of claim 1, wherein the helical flight has a pitch, the pitch of the helical flight adjacent to the inlet being greater than the pitch of the helical flight adjacent to the solids outlet such that a volume defined between turns of the helical flight and the rotatable drum adjacent to the solids outlet is less than a volume defined between turns of the helical flight and the rotatable drum adjacent to the inlet.

4. The centrifugal separator of claim 1, wherein the auger further comprises a shaft having a diameter that varies along a length of the shaft such that the diameter of the shaft adjacent to the inlet is less than the diameter of the shaft adjacent to the solids outlet such that a volume defined between turns of the helical flight and the rotatable drum adjacent to the solids outlet is less than a volume defined between turns of the helical flight and the rotatable drum adjacent to the inlet.

5. The centrifugal separator of claim 1, further comprising a housing that surrounds the perforated outer wall to capture liquids exiting the rotatable drum.

6. The centrifugal separator of claim 1, wherein:

the solids outlet comprises a back pressure surface that opens only when a predetermined pressure is applied by the solids exiting the rotatable drum; and the predetermined pressure is selected to control a liquid content of the solids exiting the rotatable drum.

7. The centrifugal separator of claim 1, wherein the outer edge of the auger comprises a wiper surface that engages the inner surface of the outer wall.

8. The centrifugal separator of claim 1, wherein the auger further comprises a shaft, a fluid passage through the shaft, and one or more discharge ports in communication with the fluid passage, the inlet comprising the one or more discharge ports.

9. The centrifugal separator of claim 1, wherein the driver is configured to rotate the rotatable drum at a speed of about 1000 rpm or greater.

10. The centrifugal separator of claim 1, further comprising a reinforcing outer shell adjacent to the perforated outer wall.

* * * * *